(12) United States Patent
Chang

(10) Patent No.: US 7,416,325 B2
(45) Date of Patent: Aug. 26, 2008

(54) FRAME FOR FIXING OPTICAL SHEET AND BACKLIGHT MODULE USING THE SAME

(75) Inventor: Shao-Han Chang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/309,899

(22) Filed: Oct. 24, 2006

(65) Prior Publication Data
US 2008/0002435 A1  Jan. 3, 2008

(30) Foreign Application Priority Data
Jun. 30, 2006  (CN) .................. 2006 1 0061424

(51) Int. Cl.
F21V 7/04       (2006.01)
G09F 13/04      (2006.01)
G02F 1/1333     (2006.01)

(52) U.S. Cl. .................. 362/633; 362/632; 362/97

(58) Field of Classification Search .......... 362/633, 362/97, 632, 634, 225, 240, 581, 362; 349/58; 361/681; 248/466
See application file for complete search history.

(56) References Cited

U.S. PATENT DOCUMENTS

| 6,175,396 | B1* | 1/2001 | Kim et al. ............ 349/58 |
| 6,552,761 | B1* | 4/2003 | Seo et al. ............ 349/58 |
| 6,741,299 | B2* | 5/2004 | Fukayama et al. .......... 349/58 |
| 6,835,961 | B2* | 12/2004 | Fukayama ............ 257/84 |
| 2004/0109308 | A1* | 6/2004 | Ho ............ 362/97 |
| 2004/0170009 | A1* | 9/2004 | Ho ............ 362/31 |
| 2005/0088839 | A1* | 4/2005 | Huang et al. ........... 362/31 |
| 2005/0105011 | A1* | 5/2005 | An ............ 349/58 |
| 2005/0259191 | A1* | 11/2005 | Park et al. ............ 349/58 |
| 2006/0044780 | A1* | 3/2006 | Kim ............ 362/29 |
| 2006/0098425 | A1* | 5/2006 | Waterhouse ............ 362/190 |
| 2006/0139962 | A1* | 6/2006 | Shin et al. ............ 362/633 |

* cited by examiner

Primary Examiner—Hargobind S. Sawhney
Assistant Examiner—David R Crowe
(74) Attorney, Agent, or Firm—Frank R. Niranjan

(57) ABSTRACT

A frame (34) for fixing an optical sheet (31) thereon includes a frame body (35) and at least a fastener (36). The frame body includes a plurality of contiguous sidewalls (352, 353, 354, and 355) and at least one latching portion (358) defined on the at least one of sidewalls. The fastener is mounted into the latching portion correspondingly such that the optical sheet is fixed on the top portions of sidewalls of the frame body. A backlight module using the frame is also provided, which has a lightweight, and also can be assembled easily.

10 Claims, 8 Drawing Sheets

FRAME FOR FIXING OPTICAL SHEET AND BACKLIGHT MODULE USING THE SAME

FIELD OF THE INVENTION

The present invention relates to a frame typically used in a backlight module, more particularly a bottom-lighting type backlight module typically used in a liquid crystal display (LCD).

DISCUSSION OF THE RELATED ART

In a liquid crystal display device, liquid crystal is manipulated to provide images for display. However, liquid crystal is a substance that does not itself illuminate light. Instead, the liquid crystal relies on light received from a light source, and thereby can display images and data. In the case of a typical liquid crystal display, a backlight module powered by electricity supplies the needed light.

Typically, a bottom-lighting type backlight module includes a plurality of light sources, a number of optical sheets, and a frame fixing the plurality of light sources and accommodating the optical sheets. The optical sheets can be selected from the group consisting of a diffusing plate, a prism sheet, or a brightness enhancement film. The optical sheets are used to improve the backlight module's optical uniformity.

FIG. 8 shows a typical backlight module 10. The frame 10 includes a bottom frame 11, a top frame 12, a plurality of light sources 13, a reflective sheet 14, and an optical sheet 16. The bottom frame 111 includes a base (not shown) and four sidewalls 112 extending from a periphery of the base to define a recess 116. A plurality of screw holes 114 is defined in top portions of the sidewalls 112. The top frame 12 has a frame body 121 defining a rectangular opening 123 therein, and a plurality of screw holes 124 disposed on the frame body 121 corresponding to the screw holes 1114 of the sidewalls 112. The reflective sheet 14 is positioned on the base of the bottom frame 11. The light sources 13 are aligned regularly above the reflective sheet 14 in the bottom frame 11. The optical sheet 16 is supported on the top of the sidewalls 112 of the bottom frame 11. The top frame 12 can be mounted onto the top of the bottom frame 111 by locking a plurality of screws (not shown) through the corresponding screw holes 114 and 124, so as to fix the optical sheet 16 tightly on the top portions of the sidewalls 112.

However, the procedure of assembling the backlight module 10 is complex and complicated, because it requires the screws to be individually locked through the screw holes 114 of the bottom frame 111 and the top frame 12. In addition, the top frame 12 makes the backlight module 10 relatively heavy, and adds to manufacturing costs.

What is needed, therefore, is a frame and backlight module using the frame which can overcome the above-described shortcomings.

SUMMARY

In one aspect, a frame for fixing an optical sheet thereon according to a preferred embodiment includes a frame body and at least one fastener. The frame body includes a plurality of contiguous sidewalls and at least one latching portion defined on at least one of the sidewalls. A supporting ledge is defined at inner sides of top portions of the sidewalls for supporting the optical sheet. Each latching portion includes at least one first latching slot defined at an inner surface of the top portion of at least one of the sidewalls adjacent to the supporting ledge, and at least one first protrusion protruding out from an outer surface of the top portion of the at least one sidewall. The at least one first latching slot and the at least one first protrusion are on opposite sides of the top portion of the at least one sidewall. The at least one fastener is mounted into the at least one latching portion correspondingly such that the optical sheet is fixed on the top portions of the sidewalls.

In another aspect, a backlight module according to a preferred embodiment includes a plurality of light sources, at least one optical sheet and a frame. The same frame as described in the previous paragraph is employed in this embodiment. The optical sheet is fixed on the top portions of the frame body by the fastener mounted into the latching portion of the frame body. The light sources are regularly arranged in the frame body under the optical sheet.

Other advantages and novel features will become more apparent from the following detailed description of preferred embodiments when taken in conjunction with the accompanying drawings.

BRIEF DESCRIPTION OF THE DRAWINGS

The components in the drawings are not necessarily drawn to scale, the emphasis instead being placed upon clearly illustrating the principles of the present frame and related backlight module. Moreover, in the drawings, like reference numerals designate corresponding parts throughout the several views.

DETAILED DESCRIPTION OF THE PREFERRED EMBODIMENTS

Reference will now be made to the drawings to describe preferred embodiments of the present frame and backlight module, in detail.

Figure 1:
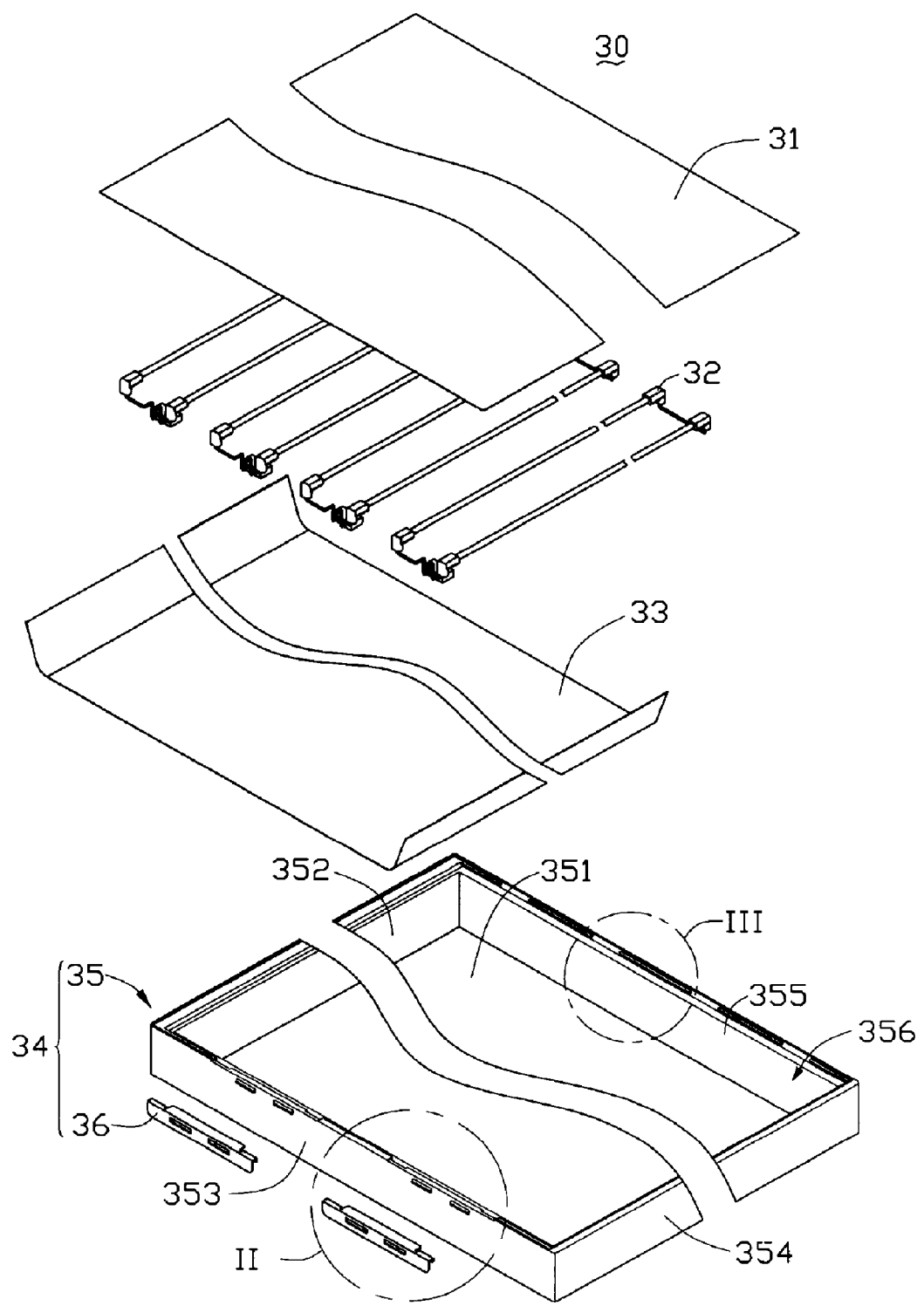
FIG. 1 is an abbreviated, schematic, exploded isometric view of a backlight module according to a first preferred embodiment of the present invention.
Figure 2:
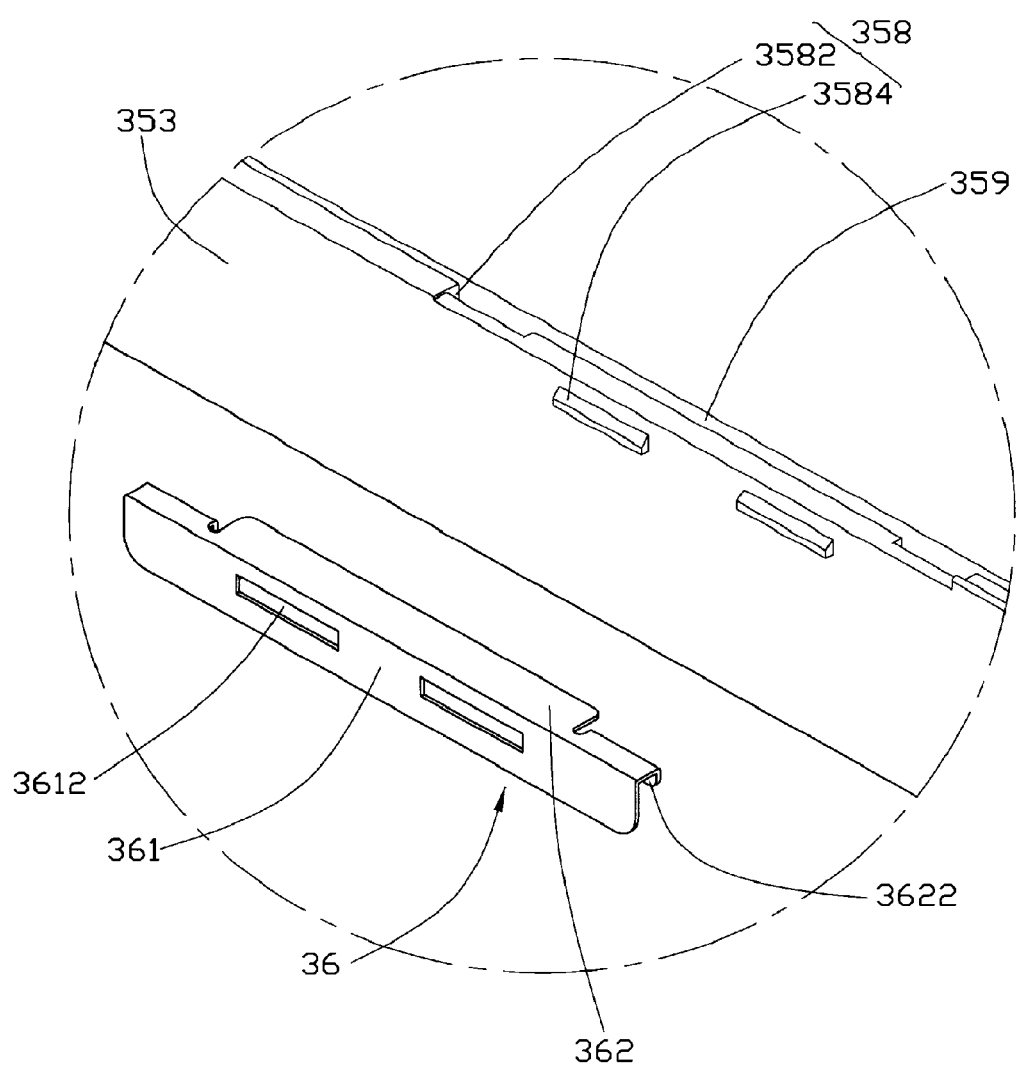
FIG. 2 is an enlarged view of a circled portion II of FIG. 1.

Referring to FIGS. 1 and 2, a backlight module 30 in accordance with a first preferred embodiment is shown. The backlight module 30 includes an optical sheet 31, a plurality of light sources 32, a reflective sheet 33, and a frame 34. The frame 34 includes a frame body 35 and two fasteners 36. The frame body 35 includes a rectangular base 351 and four sidewalls 352, 353, 354, and 355 formed at a periphery of the base 351, thereby cooperatively defining a recess 356. The sidewall 353 defines two latching portions 358 at a top area thereof. The reflective sheet 33 is disposed on the base 351. The optical sheet 31 is fixed on top of the frame body 35 by mounting the two fasteners 36 into the two latching portions 358 of the frame body 35. The light sources 32 are regularly arranged within the frame body 35 between the optical sheet 31 and the reflective sheet 33. The light sources 32 are configured for emitting light to the optical sheet 31. The reflective sheet 33 is configured for reflecting light to the optical sheet 31, so as to increase a light energy utilization rate of the backlight module 30. The light is refracted and diffused in the optical sheet 31, so that substantially planar light is outputted from the optical sheet 31. In this embodiment, the optical sheet 31 is a light diffusion sheet.

A supporting ledge 359 is defined along an inner side of top areas of the four sidewalls 352, 353, 354, and 355. That is, the supporting ledge 359 is configured to be a continuous recessed shelf at top surface portions of the four sidewalls 352, 353, 354, and 355. A size of the optical sheet 31 is configured to conform with a size defined by inner boundaries of the sidewalls 352, 353, 354, and 355 that surround the supporting ledge 359. Thus the optical sheet 31 can be fittingly received between the sidewalls 352, 353, 354, and 355 and supported on the supporting ledge 359 of the frame body 35.

The two latching portions 358 are separate from each other but aligned with each other at the top area of the sidewall 353. Each latching portion 358 includes two latching slots 3582 and two protrusions 3584. The two latching slots 3582 are separate from each other, and are defined in an inner surface portion of the top area of the sidewall 353 that bounds the supporting ledge 359. The two protrusions 3584 protrude out from an outer surface of the top area of the sidewall 353 between the two latching slots 3582.

Each fastener 36 includes a mounting plate 361, and a retaining plate 362 that extends perpendicularly from a side of the mounting plate 361. The mounting plate 361 defines two openings 3612 therein corresponding to the two protrusions 3584. The retaining plate 362 defines two hooked tabs 3622 at two ends thereof corresponding to the two latching slots 3582. Each hooked tab 3622 runs parallel to the mounting plate 361. A size of the hooked tab 3622 is configured for mating in the corresponding latching slot 3582, and a size of the opening 3612 is configured for receiving the corresponding protrusion 3584. A width of the retaining plate 362 is configured to be approximately equal to or larger than a transverse width of the sidewall 353. When each of the fasteners 36 is mounted onto the corresponding latching portion 358, the two protrusions 3584 are inserted into the two openings 3612 for restricting the mounting plate 361 of the fasteners 36 to slide along an outer surface of the sidewall 353, and the two hooked tabs 3622 are held in the two latching slots 3582 to keep an inner surface of the mounting plate 361 tightly held on the outer surface of the sidewall 353. Accordingly, the retaining plate 362 can press the optical sheet 31 tightly.

Figure 3:
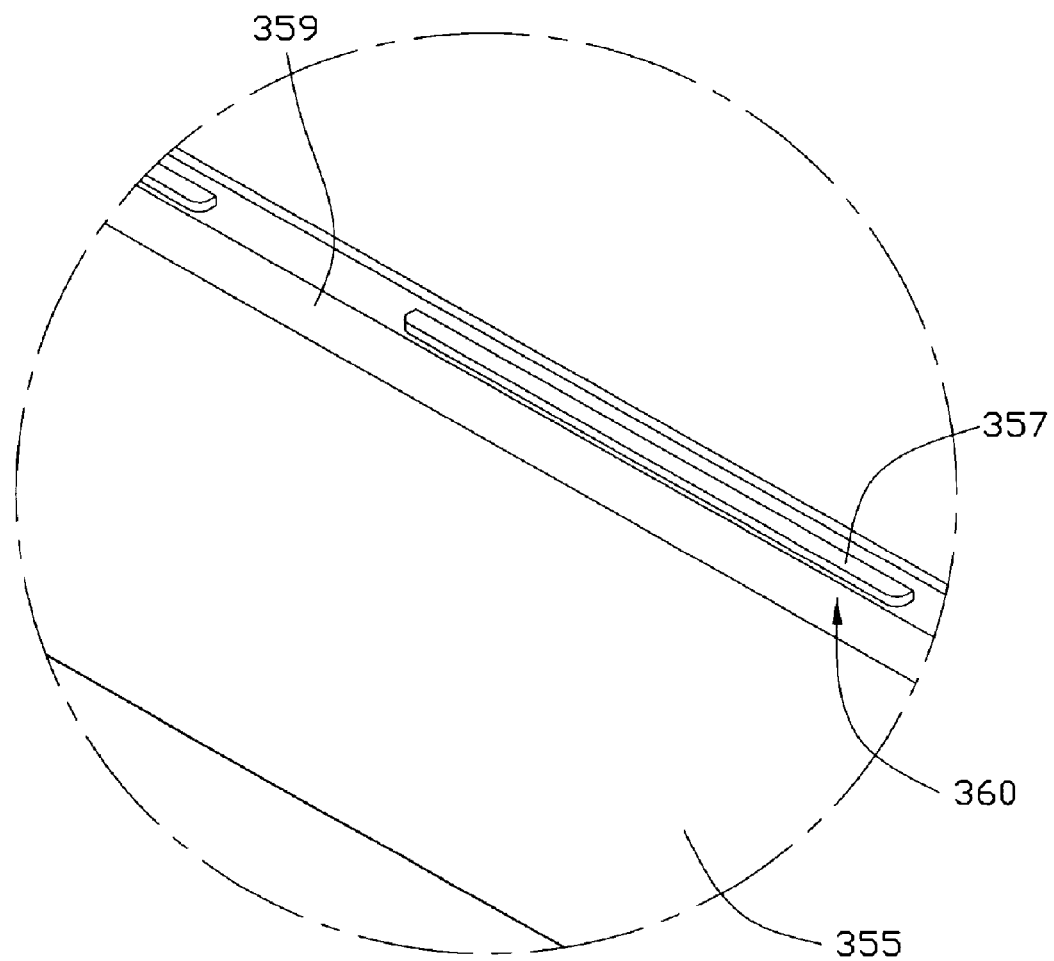
FIG. 3 is an enlarged view of a circled portion III of FIG. 1.

Also referring to FIG. 3, the sidewall 355 defines a plurality of protruding rims 357 at an inner surface of a top area thereof that bounds the supporting ledge 359. The protruding rims 357 and the supporting ledge 359 cooperatively defines a receiving channel 360 for receiving the optical sheet 31. In addition, a rubber film may be formed on a bottom surface of each protruding rim 357 that faces the supporting ledge 359. The rubber film improves friction between the protruding rim 357 and the optical sheet 31 in Thereby, the optical sheet 31 is restricted from moving along a direction parallel to the sidewall 355 in the event that the frame 34 sustains shock or vibration.

Figure 4:
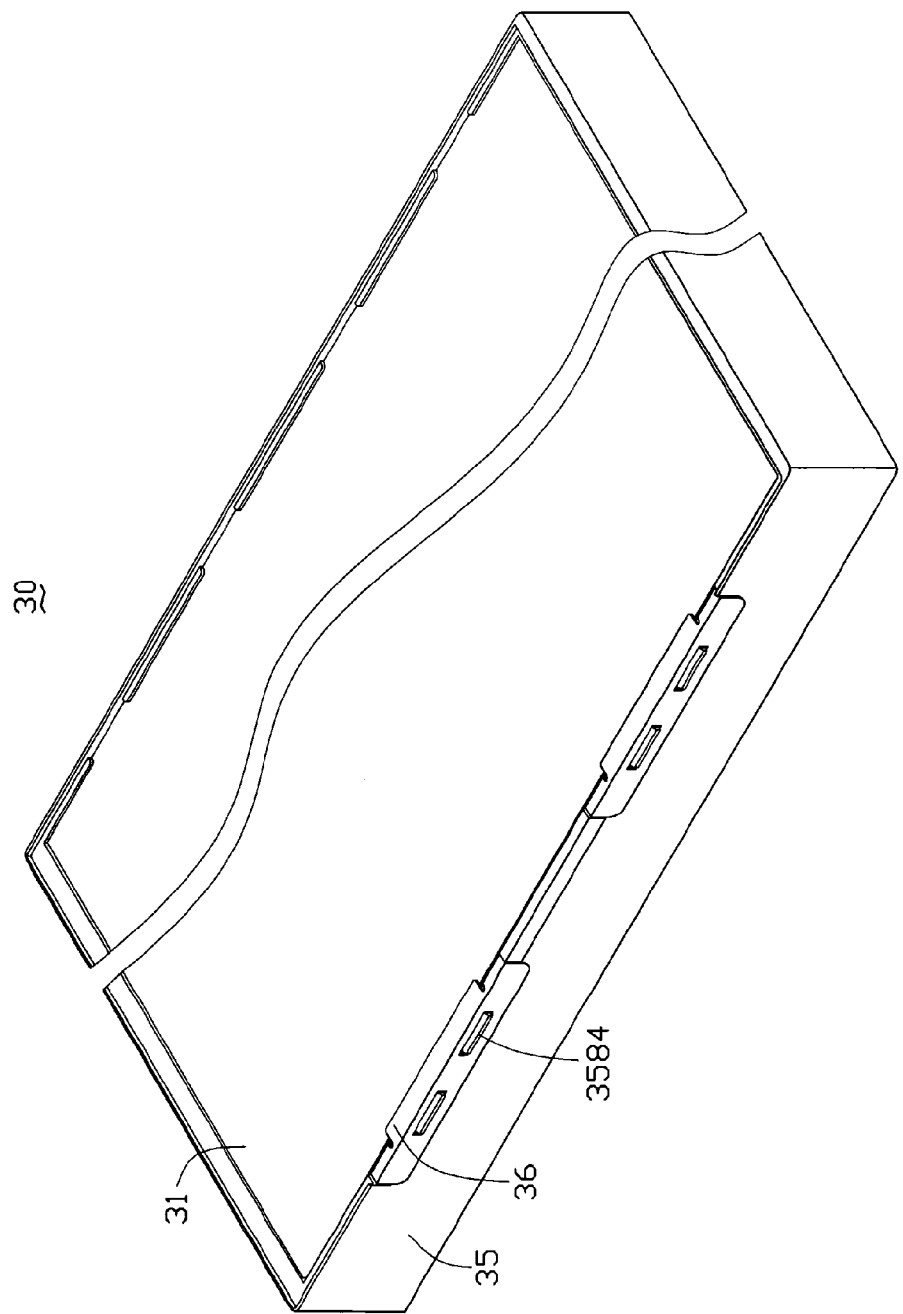
FIG. 4 is an enlarged, assembled view of the backlight module of FIG. 1.

Referring to FIG. 4, the process of assembling the optical sheet 31 onto the frame body 35 is simple. Firstly, one end of the optical sheet 31 is inserted into the receiving channel 360 of the sidewall 355, so that the optical sheet 31 is supported on the supporting ledge 359 thereat; secondly, the two fasteners 36 are mounted onto the corresponding two latching portions 358 of the frame body 35, whereby the protrusions 3584 are inserted into the openings 3612, and the hooked tabs 3622 are held in the latching slots 3582. Therefore, the optical sheet 31 is secured on the securing ledge 359 of the frame body 35 tightly with the cooperative help of the fasteners 36 and the protruding rims 357. In addition, compared with the above-described conventional backlight module 10, the present backlight module 30 has a relatively lightweight design because a top frame such as the top frame 12 is not employed.

The light sources 32 may be selected from the group consisting of cold cathode fluorescent lamps and light emitting diodes. It is to be understood that the present backlight module is not limited to only employing one optical sheet 31 such as the light diffusion sheet used for uniformly diffusing light emitted from the light source. Rather, any desired combination of optical sheets may be employed. For example, the optical sheets can include at least one light diffusion sheet and at least one prism sheet, or can be other suitable optical sheets for improving optical performance.

It is noted that the numbers and shapes of the latching portions 358 and the fasteners 36 are not limited to those as described above and illustrated in relation to the first preferred embodiment. At least one latching portion 358 and at least one fastener 36 should be considered to be within the scope of the present backlight module, as long as the applicable latching portion(s) 358 and fastener(s) 36 cooperatively fix the optical sheet 31 on the frame body 35. Similarly, the numbers and shapes of the latching slots 3582 and the protrusions 3584 of the latching portions 358, the numbers and shapes of the openings 3612 and the hooked tabs 3622 of the fasteners 36, are all not limited to those as described above and illustrated in relation to the first preferred embodiment. It is to be understood that the base 351 of the frame body 35, and the reflective sheet 33 of the backlight module 30, can be omitted in other embodiments.

Figure 5:
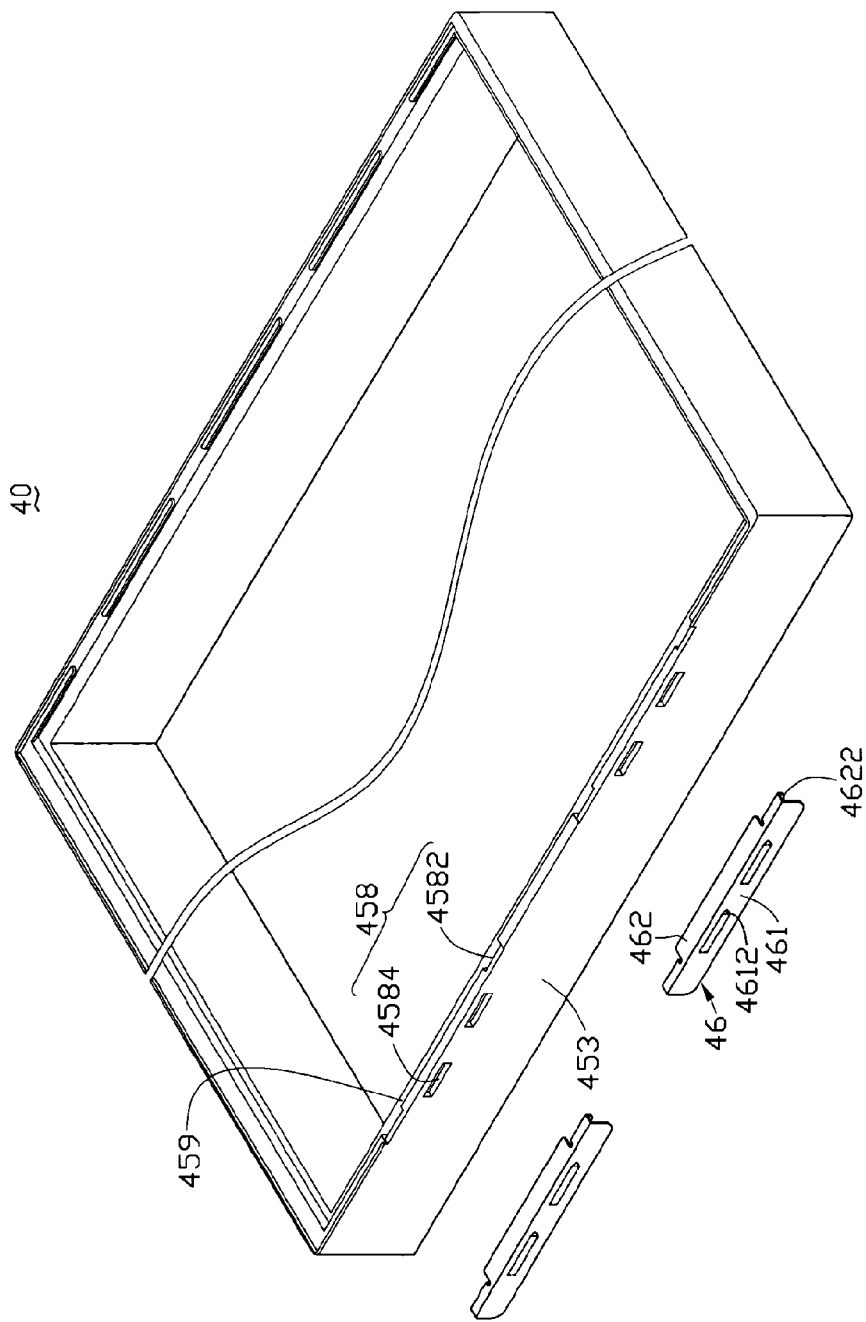
FIG. 5 is an abbreviated, schematic, exploded isometric view of a frame according to a second preferred embodiment of the present invention.

Referring to FIG. 5, a frame 40 in accordance with the second preferred embodiment is shown. The frame 40 is similar in principle to the frame 34 of the first embodiment, except that fasteners 46 and latching portions 458 of the frame 40 are different. Each latching portion 458 includes two first latching slots 4582 and two second latching slots 4584. The two first latching slots 4582 are separate from each other, and are defined in an inner surface portion of a top area of a sidewall 453 that bounds a supporting ledge 459. The two second latching slots 4584 are defined in an outer surface portion of the top area of the sidewall 453 between the two first latching slots 4582. Each fastener 46 includes a mounting plate 461 and a retaining plate 462. The mounting plate 461 includes two protrusions 4612 each protruding out from an inner surface thereof, the protrusions 4612 corresponding to the two second latching slots 4584. The retaining plate 462 includes two hooked tabs 4622 at two ends thereof, corresponding to the two first latching slots 4582. Each hooked tab 4622 is bent down from the retaining plate 462, and is parallel to the mounting plate 461.

When each fastener 46 is mounted into the corresponding latching portion 458, the two protrusions 4612 are inserted into the two second latching slots 4584, and the two hooked tabs 4622 are held in the two first latching slots 4582.

Figure 6:
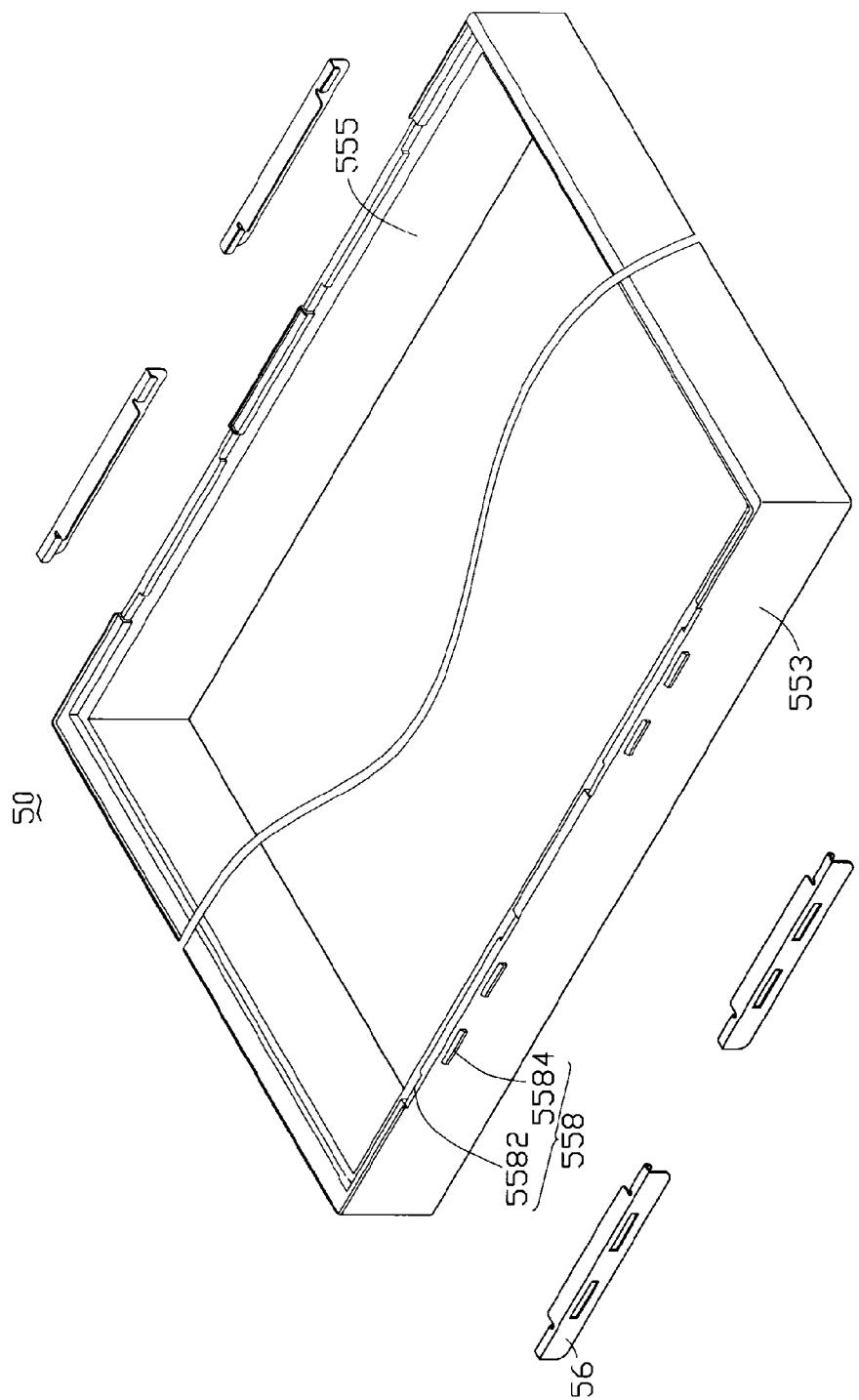
FIG. 6 is an abbreviated, schematic, exploded isometric view of a frame according to a third preferred embodiment of the present invention.

Referring to FIG. 6, a frame 50 in accordance with a third preferred embodiment is shown. The frame 50 is similar in principle to the frame 34 of the first embodiment, except that the frame 50 includes four latching portions 558 and four fasteners 56. The four latching portions 558 are defined on two opposite sidewalls 553 and 555 respectively. Each latching portion 558 includes two latching slots 5582 and two protrusions 5584. The four fasteners 56 can be mounted onto the four corresponding latching portions 558, so as to fix an optical sheet (not shown) on the frame 50.

Figure 7:
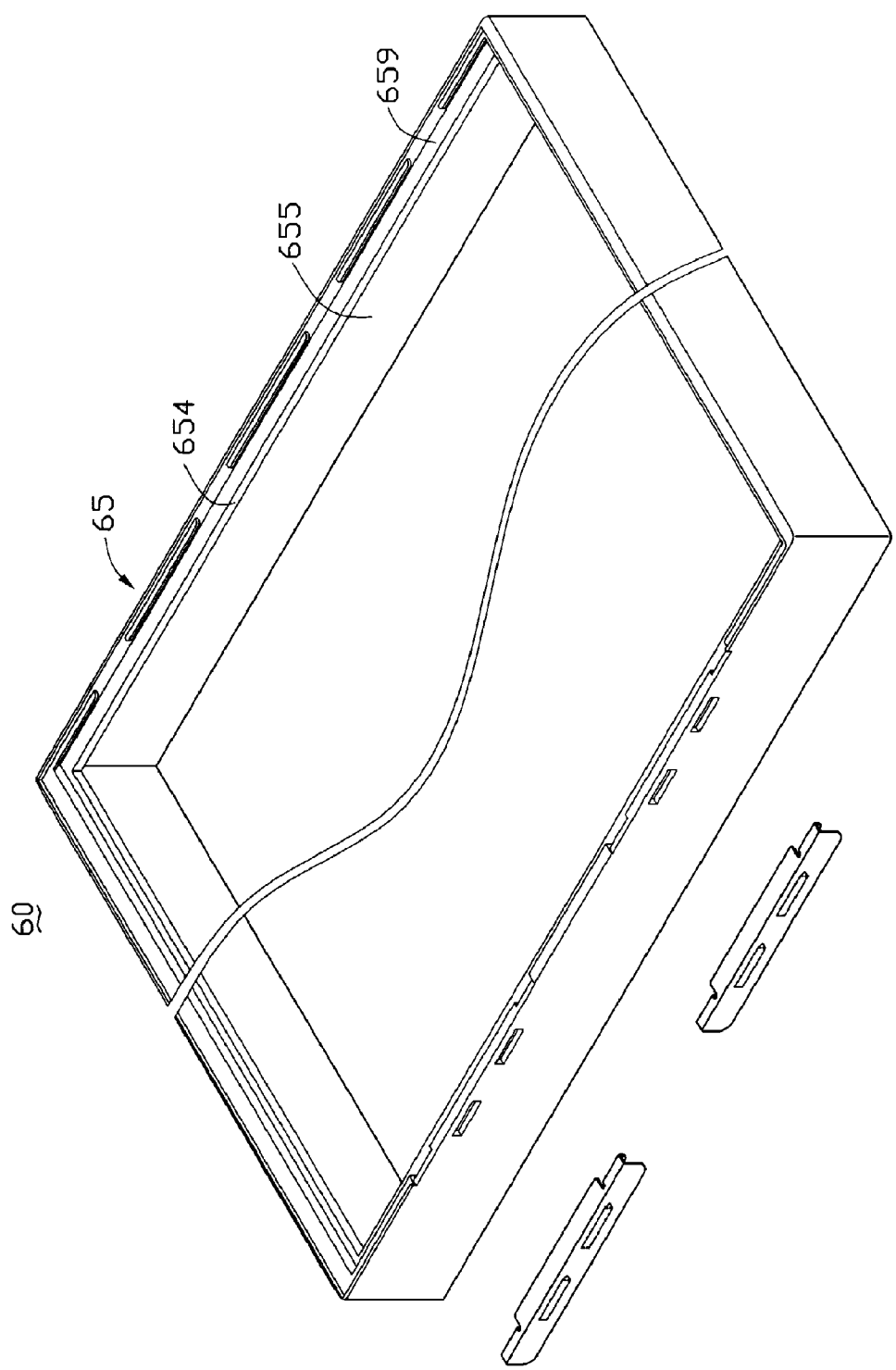
FIG. 7 is an abbreviated, schematic, exploded isometric view of a frame according to a fourth preferred embodiment of the present invention.
Figure 8:
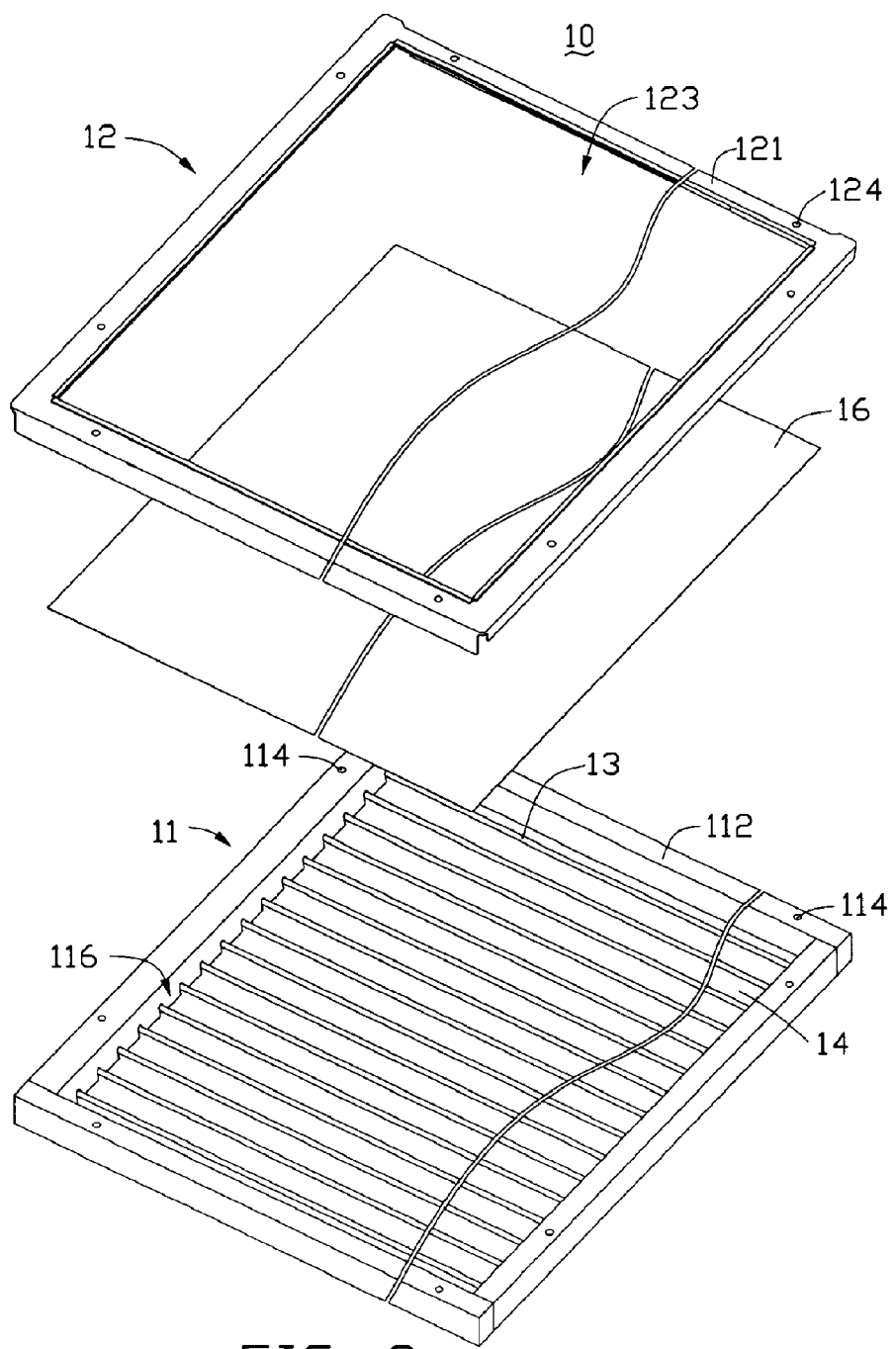
FIG. 8 is an abbreviated, schematic, exploded isometric view of a conventional backlight module.

Referring to FIG. 7, a frame 60 in accordance with a fourth preferred embodiment is shown. The frame 60 is similar in principle to the frame 40 of the second embodiment, except that the frame 60 includes a protruding wall 654 protruding out from inner sides of top areas of sidewalls 655 of a frame body 65. The protruding wall 654 serves as a supporting ledge 659 for supporting an optical sheet (not shown). In this embodiment, the frame 60 is lightweight because the sidewalls 655 of the frame body 65 are configured to be thin.

Finally, while particular embodiments have been described above, the description is illustrative of principles of the invention and is not to be construed as limiting the invention. Therefore, various modifications can be made to the embodiments by those skilled in the art without departing from the true spirit and scope of the invention as defined by the appended claims.

What is claimed is:

1. A frame for fixing an optical sheet thereon, the frame comprising:
   a frame body comprising:
      a plurality of contiguous sidewalls,
      a supporting ledge defined at inner sides of top portions of the sidewalls for supporting the optical sheet, and
      at least one latching portion defined on at least one of the sidewalls, each latching portion comprising:
         at least one first latching slot defined at an inner surface of the top portion of the at least one sidewall adjacent to the supporting ledge; and
         at least one first protrusion protruding out from an outer surface of the top portion of the at least one sidewall, wherein the at least one first latching slot and the at least one first protrusion are on opposite sides of the top portion of the at least one sidewall; and
   at least one fastener comprising a mounting plate and a retaining plate that extends perpendicularly from a side of the mounting plate, the mounting plate defining at least one opening therein corresponding to the at least one first protrusion, the retaining plate defining at least one hooked tab corresponding to the at least one first latching slot, the at least one first protrusion being configured to be inserted into the at least one opening, and the at least one hooked tab being configured to be held in the at least one first latching slot, such that the optical sheet is fixed on the supporting ledge of the frame body.

2. The frame according to claim 1, wherein the supporting ledge is defined by a protruding wall protruding out from inner sides of the top portions of the sidewalls of the frame body.

3. The frame according to claim 1, wherein one of the sidewalls opposite to the at least one sidewall having the at least one latching portion defines one or more protruding rims at an inner surface of the top portion thereof adjacent to the supporting ledge, and the protruding rims and the supporting ledge cooperatively define a receiving channel configured for receiving a part of the optical sheet.

4. The frame according to claim 1, wherein the at least one latching portion is a plurality of latching portions defined on two opposite of the sidewalls, the at least one fastener is a plurality of fasteners corresponding to the latching portions, and the fasteners are configured to be mounted onto the corresponding latching portions to thereby fix the optical sheet on the supporting ledge of the frame body.

5. A backlight module comprising:
   a plurality of light sources;
   at least one optical sheet;
      a frame comprising a frame body, the frame body comprising:
         a plurality of sidewalls connected with each other,
         a supporting ledge defined at inner sides of top portions of the sidewalls for supporting the at least one optical sheet, and
         at least one latching portion defined on at least one of the sidewalls, each latching portion comprising:
            at least one first latching slot defined at an inner surface of the top portion of the at least one sidewall adjacent to the supporting ledge, and
            at least one first protrusion protruding out from an outer surface of the top portion of the at least one sidewall, wherein the at least one first latching slot and the at least one first protrusion are on opposite sides of the top portion of the at least one sidewall; and
      at least one fastener comprising a mounting plate and a retaining plate that extends perpendicularly from a side of the mounting plate, the mounting plate defining at least one opening therein corresponding to the at least one first protrusion, the retaining plate defining at least one hooked tab corresponding to the at least one first latching slot;
   wherein the at least one first protrusion of the at least one fastener is inserted into the at least one opening, and the at least one hooked tab of the at least one fastener is held in the at least one first latching slot such that the at least one fastener fixes the at least one optical sheet at the supporting ledge of the frame body, and the light sources are arranged in the frame body under the at least one optical sheet for illuminating the at least one optical sheet.

6. The backlight module according to claim 5, wherein the supporting ledge is defined by a protruding wall protruding out from inner sides of the top portions of the sidewalls of the frame body.

7. The backlight module according to claim 5, wherein one of the sidewalls opposite to the at least one sidewall having the at least one latching portion defines one or more protruding rims at an inner surface of the top portion thereof adjacent to the supporting ledge, and the protruding rims and the supporting ledge cooperatively define a receiving channel configured for receiving a part of the at least one optical sheet.

8. The backlight module according to claim 5, wherein the at least one latching portion is a plurality of latching portions defined on two opposite of the sidewalls, the at least one fastener is a plurality of fasteners corresponding to the latching portions, and the fasteners are configured to be mounted onto the corresponding latching portions to thereby fix the at least one optical sheet on the supporting ledge of the frame body.

9. A frame for fixing an optical sheet thereon, the frame comprising:
   a frame body comprising:
      a plurality of contiguous sidewalls,
      a supporting ledge defined at inner sides of top portions of the sidewalls for supporting the optical sheet, and
      at least one latching portion defined on at least one of the sidewalls, each of the at least one latching portion comprising:
         at least one first latching slot defined in an inner surface of the top portion of the at least one sidewall adjacent to the supporting ledge, and at least one second latching slot defined in an outer surface of the top portion of the at least one sidewall, wherein the at least one first latching slot and the at least one second latching slot are on opposite sides of the top portion of the at least one sidewall; and at least one fastener comprising a mounting plate and a retaining plate perpendicularly adjoining each other, the mounting plate defining at least one protrusion protruding out from an inner surface thereof corresponding to the at least one second latching slot, the retaining plate defining at least one hooked tab corresponding to the at least one first latching slot, the at least one protrusion configured to be inserted into the at least one second latching slot, and the at least one hooked tab configured to be held in the at least one first latching slot such that the optical sheet is fixed on the supporting ledge of the frame body.

10. The frame according to claim 9, wherein the at least one latching portion is a plurality of latching portions defined on two opposite of the sidewalls, the at least one fastener is a plurality of fasteners corresponding to the latching portions, and the fasteners are configured to be mounted onto the corresponding latching portions to thereby fix the optical sheet on the supporting ledge of the frame body.

* * * * *